G. H. BINDON.
ELECTRIC COOKER.
APPLICATION FILED JAN. 24, 1921.
1,428,825.
Patented Sept. 12, 1922.
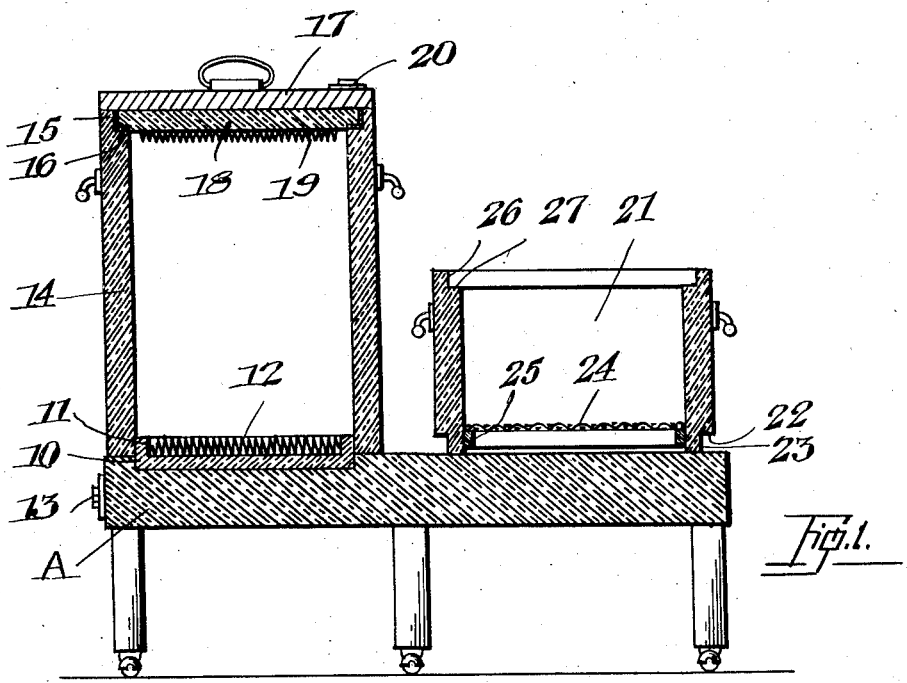
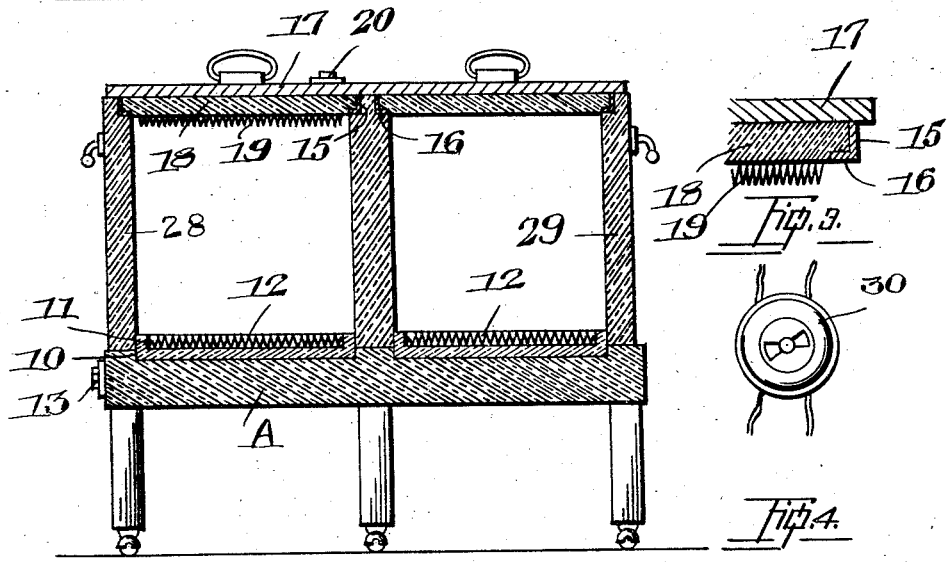
INVENTOR
GEORGE H. BINDON.
BY Fetherstonhaugh & Co.
ATTYS.

Patented Sept. 12, 1922.

1,428,825

UNITED STATES PATENT OFFICE.

GEORGE HEDLEY BINDON, OF OTTAWA, ONTARIO, CANADA.

ELECTRIC COOKER.

Application filed January 24, 1921. Serial No. 439,531.

*To all whom it may concern:*

Be it known that I, GEORGE HEDLEY BINDON, a subject of the King of Great Britain, a resident of the city of Ottawa, Province of Ontario, Dominion of Canada, have invented certain new and useful Improvements in Electric Cookers, of which the following is a specification.

This invention relates to improvements in electric cookers and the objects of the invention are to construct the cooker sectional so that a cooker of the desired capacity can be readily assembled and placed in use, to provide the cooker with a heating element which will be located in juxta-position to a heat storage and retaining member so that the heat given out by the said heating element will be absorbed by the storage member and may be utilized after the heating element has been cut off Further objects are to provide a portable, removable cover for the cooker provided with a heat retaining and storage member on which is mounted an electrical heating element, the said cover being designed to be used with any of the sections of the cooker in a manner to be described later.

Further objects are to construct a plurality of sections and provide each with a heating element and heat storage and retaining member and connecting the heating element with a source of electrical supply whereby either of the heating elements may be utilized, but, when one element is active, then the other element will be inactive.

With the above and other objects in view, the invention consists of the improved construction and arrangement of parts particularly described in the following specification and illustrated in the accompanying drawings.

In the drawings:

Figure 1 is a sectional elevation of one form of my electric heater.

Figure 2 is a sectional elevation of another embodiment of my invention.

Figure 3 is a fragmentary enlarged sectional elevation of the removable cover of the cooker.

Figure 4 is a front elevation of a switch adapted for use on that form of the invention illustrated in Figure 2.

Like characters of reference refer to like parts in the several figures.

Referring to the drawings; A represents a base constructed of any suitable material which is a non-conductor of heat, the said base being provided with a recess 10 in the upper face in which a heat retaining and storage member 11 is mounted. In this heat retaining and storage member an electrical resistance 12 is embedded and is connected to a suitable socket or plug 13 which may be attached by suitable wiring to an ordinary light socket.

The body 14 of the cooker is removable and is in the form of a sleeve of heat non-conducting material, the lower end of the body fitting over and embracing the member 11.

The upper end of the body 14 is provided with an inner peripheral recess 15 forming a shoulder 16.

The cover 17 is removable and constructed of suitable heat insulating material being provided on the inner wall with a heat retaining and storage member 18 on which the electrical resistance 19 is mounted, this resistance being connected to a plug 20 which may be attached by suitable wiring to an ordinary light socket.

This cover increases the heating capacity of the cooker and, while it may be used auxiliary to the lower resistance, it may also be used independently of the said lower resistance.

The sections of the cooker may be in the form which is illustrated at 21 in Figure 1, that is to say, a sleeve like member having a peripheral recess 22 at the lower end forming a spike 23 which will fit in the recess 15 of the body portion 14 and abut the shoulder 16. Adjacent to the lower end of the section 21 I provide a shelf 24, preferably formed of perforated metal or wire mesh to permit the heat readily passing in to the section and this shelf is held in position by a member 25.

The upper end of the section 21 is provided with a recess 26 forming a shoulder 27 and is similar to the recess 15 and shoulder 16 above described.

In Figure 1, the section 21 shown is located on the base adjacent to the body portion 14 and may be used independently thereof if necessary.

The normal use of the cooker is as follows:

The meats or vegetables to be cooked are placed within the body portion 14 and if more than one section of the cooker is required, then a section similar to 21 will be fitted on the body 14 so permitting a second variety of vegetables or meat being placed in the upper section. The cover 17 is now positioned on the section 21 and the cooker may be heated by the electrical resistances 12 and 19. When the heat retaining members 11 and 18 have stored the desired amount of heat, the electric current may be cut off.

If the section 21 is to be used independently, then it is positioned as shown in Figure 1 and, when a dish has been cooked to the desired extent in the body portion 14, it may be removed to the section 21 and the cover 17, placed thereon and a browning operation, or, a completion of the cooking, effected.

Or, again, the body 14 may be used for cooking meats and vegetables, and baking, such as pies and biscuits may be fired in the section 21. It will be understood that two covers will, of course, be necessary and the cover for the section 21 will be fitted with an electrical resistance, whereas the cover for the body portion 14 may not have the resistance thereon.

In Figure 2, two heaters or cookers 28 and 29 are shown which are similar to that already described with regard to the body portion in Figure 1 and also with regard to the lower heat retaining and storage member and electrical resistance, and one cover is shown with an electrical resistance thereon while the other does not have an electrical resistance.

The principal feature of this embodiment of the invention is that only one cooker may be heated at one time by means of the electrical resistance and I provide a switch 30, such that, if the cooker 28 is being heated by its lower electrical resistance, then the electrical resistance in the lower portion of the cooker 29 will be inactive, or vice versa.

The advantage of this cooker is that, after bringing the heat retaining and storage member in the cooker 28 to the desired temperature, the current may be switched to the resistance in the cooker 29, bringing the temperature of the heat retaining and storage member to the desired degree and then cutting off the current.

This allows continuous cooking operations in their several successive stages being carried out simultaneously without any fear of fuses being blown or destroyed which would otherwise be likely to occur if all the resistances were heated simultaneously.

A plurality of cookers may thus be used and it will depend entirely on the capacity required whether, for instance, the cooker is being used for household cooking or in public restaurants, etc.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A cooker having a base of heat non-conducting material and a removable body of heat non-conducting material in engagement with the base and adapted to be lifted therefrom, a heat retaining and storage member on the base within the body extending above the plane of contact between the base and the body, and an electrical resistance on the member, as and for the purpose specified.

2. The cooker claimed in claim 1, in which a removable cover is provided having a heat retaining and storage member thereon, and an electrical resistance on said member.

3. The cooker claimed in claim 1, in which the body portion is formed of sections, the upper sections having a perforated shelf therein.

4. A cooker formed of a base of heat non-conducting material and a plurality of removable sections each contacting with the base having a heat retaining and storage member therein projecting above the surface of the base, an electrical resistance on each heat retaining and storage member, and means co-operating with the resistance whereby when one resistance is active, the others are inactive.

5. The cooker claimed in claim 4, in which removable covers are provided for each section, one cover having an electrical resistance thereon, and means co-operating with all the resistance of the cooker whereby when two resistances are active, the remaining resistances are inactive.

6. The cooker claimed in claim 1, in which auxiliary resistances are provided whereby the heating capacity of the cooker can be increased.

7. An electrical sectional cooker having a body portion and sections capable of being built to the body portion, each section being adapted to perform a cooking operation when disassembled from the body portion and placed along side thereof.

8. A device of the character described comprising a base, of non-conducting material, a plurality of cooking sections of non-conducting material adapted to be set side by side on the base or to be set one on top of each other, an electrically heated heat retaining and storage member in each of said sections.

9. A device of the character described comprising a base of heat non-conducting material, a plurality of cooking sections of non-conducting material adapted to be set side by side on the base or to be set one on top of each other, an electrically heated heat retaining and storage member in each of said sections, and an electrically heated cover for one of the sections.

In witness whereof I have hereunto set my hand in the presence of a witness.

GEORGE HEDLEY BINDON.

Witness:
RUSSEL B. SMART.